United States Patent [19]

Biermann

[11] Patent Number: 4,542,629

[45] Date of Patent: Sep. 24, 1985

[54] VARIABLE EFFECT DESORBER-RESORBER ABSORPTION CYCLE

[75] Inventor: Wendell J. Biermann, Fayetteville, N.Y.

[73] Assignee: The United States of America as represented by the United States Department of Energy, Washington, D.C.

[21] Appl. No.: 668,431

[22] Filed: Nov. 5, 1984

[51] Int. Cl.⁴ .............................................. F25B 15/00
[52] U.S. Cl. ..................................................... 62/476
[58] Field of Search .......................................... 62/476

[56] References Cited

U.S. PATENT DOCUMENTS

| 3,817,050 | 6/1974 | Alexander et al. | 62/476 X |
| 4,028,078 | 6/1977 | Peckham | 62/476 X |
| 4,442,677 | 4/1984 | Kauffman | 62/476 X |

Primary Examiner—Lloyd L. King
Attorney, Agent, or Firm—Robert H. Kelly

[57] ABSTRACT

An absorption refrigeration system has an intermediate temperature desorber-resorber pair. A valve between the desorber-resorber pair is modulated to control the capacity for load matching.

1 Claim, 2 Drawing Figures

VARIABLE EFFECT DESORBER-RESORBER ABSORPTION CYCLE

STATEMENT AS TO RIGHTS TO INVENTIONS MADE UNDER FEDERALLY SPONSORED RESEARCH AND DEVELOPMENT

The U.S. Government has rights in this invention pursuant to contract No. W-7405-ENG-26 awarded by the U.S. Department of Energy.

BACKGROUND OF THE INVENTION

This invention relates to an absorption machine and, more particularly, to a variable effect desorber-resorber absorption heat pump/refrigeration machine utilizing two generators, two absorbers, a condenser, an evaporator and an intermediate desorber/resorber pair.

Single effect absorption refrigeration systems are well known in the art. In a typical single effect absorption system water is generally the refrigerant and lithium bromide is generally the absorbent, and together they are called a solution pair. Some systems employ high temperature solution pairs that are capable of operating at higher generator temperatures to increase efficiency but are precluded from operating at lower evaporator temperatures due to the possibility of freezing and crystallization of the refrigerant, while other chemical systems capable of operating at lower evaporator temperatures, even temperatures below the freezing point of water, could not operate at the higher generator temperatures, which are a consequence of the lower evaporator temperature, without stability problems. Consequently, a single effect system is generally limited in the selection of higher and lower operating temperatures in the generator and evaporator.

Absorption cycles of a single effect type generally comprise a generator for heating a weak or relatively dilute absorbent solution to generate both a vapor of refrigerant and a strong or relatively concentrated absorbent solution, a condenser for condensing the vapor of refrigerant, an evaporator for evaporating the condensed refrigerant to provide cooling, and an absorber for absorbing the refrigerant vapor from the evaporator into the strong absorbent solution to form a weak solution. However, the thermal efficiency (coefficient of performance or COP) of a single effect type absorption system is relatively low and ordinarily about 0.6–0.8. Accordingly, with a view toward increasing the thermal efficiency of absorption cycles, two stage generator type absorption units have been developed in which a further low side generator and condenser are additionally provided in the single effect type absorption refrigerator such that the high temperature vapor of refrigerant generated in a first high side generator is utilized to heat a second or low side generator. In general, a two stage generator type absorption unit comprises a high temperature generator, a low temperature generator, a high and low temperature condenser, an evaporator, an absorber, a high temperature heat exchanger and a low temperature heat exchanger. In the high temperature generator, a refrigerant dissolved in a solution, such as an aqueous solution of lithium bromide, is heated by heating means to discharge the dissolved refrigerant as vapor. Further, in one configuration, the discharged refrigerant vapor is fed through a heat transfer tube bundle to the low temperature generator to heat the weak solution supplied from the absorber, and while the refrigerant in the weak solution is discharged therefrom as vapor, the vapor from the strong solution is cooled by the latent heat of evaporation and nearly all is condensed prior to entering the condenser. The refrigerant vapor produced in the low temperature generator is supplied to the condenser and cooled by cooling means thereof and then condensed. This condensed refrigerant is generally sprayed into the evaporator thereby cooling the fluid means which cools a load. Moreover, the solution concentrated by discharging the refrigerant vapor in the high temperature generator is fed to the high temperature heat exchanger in heat exchange relation with the low temperature weak solution supplied from the low temperature generator, thereby suitably lowering its temperature, and then fed to the low temperature heat exchanger in heat exchange relationship with the weak solution derived from the absorber. Then the solution flows to the absorber which is cooled by cooling means. Thus, solution sprayed into the absorber absorbs the refrigerant vapor supplied from the evaporator, and provides a weak solution. This solution is further directed to the low temperature heat exchanger as described above.

In this manner, the two stage generator type absorption chiller is arranged such that the external heat supplied is utilized twice, once in the high and once in the low temperature generator, thus the thermal efficiency increases in comparison with the single effect type system.

SUMMARY OF THE INVENTION

The invention is directed to an improved variable effect desorber-resorber absorption heat pump/refrigeration cycle which utilizes a staged pair of generators and absorbers with an evaporator, condenser, and an intermediate desorber/resorber pair. The loop operates at five temperatures within a temperature range and three pressures within a pressure range.

In a preferred embodiment, the strong solution from the high temperature generator, which is heated from an external source, such as gas or steam, flows through a high temperature heat exchanger to an intermediate temperature absorber or resorber and then through a low temperature heat exchanger to a high temperature absorber. The vaporized refrigerant from the high temperature generator combines with the refrigerant vapor from the low temperature generator in the condenser and then flows, after condensing, to the evaporator and then to the high and low temperature absorbers. The low temperature generator is fired from heat rejected from the intermediate resorber. The weak solution from the high and low temperature absorbers is pumped in heat exchange relationship, through the low temperature heat exchanger to the intermediate temperature desorber. Some vapor is boiled off the weak solution in the desorber and passes through a variable control valve to the resorber where it is absorbed. The solution in the desorber is pumped through the high temperature heat exchanger to the low temperature generator.

Accordingly, it is an object of the present invention to provide an absorption heat pump/refrigeration system that is capable of operating at generator and evaporator temperatures well below prior cycles without compromising the high efficiency of the higher evaporator and generator temperatures.

It is another object of the present invention to provide a control valve between the desorber and resorber to vary the amount of refrigerant vapor flowing therebetween, for load matching.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which thee is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
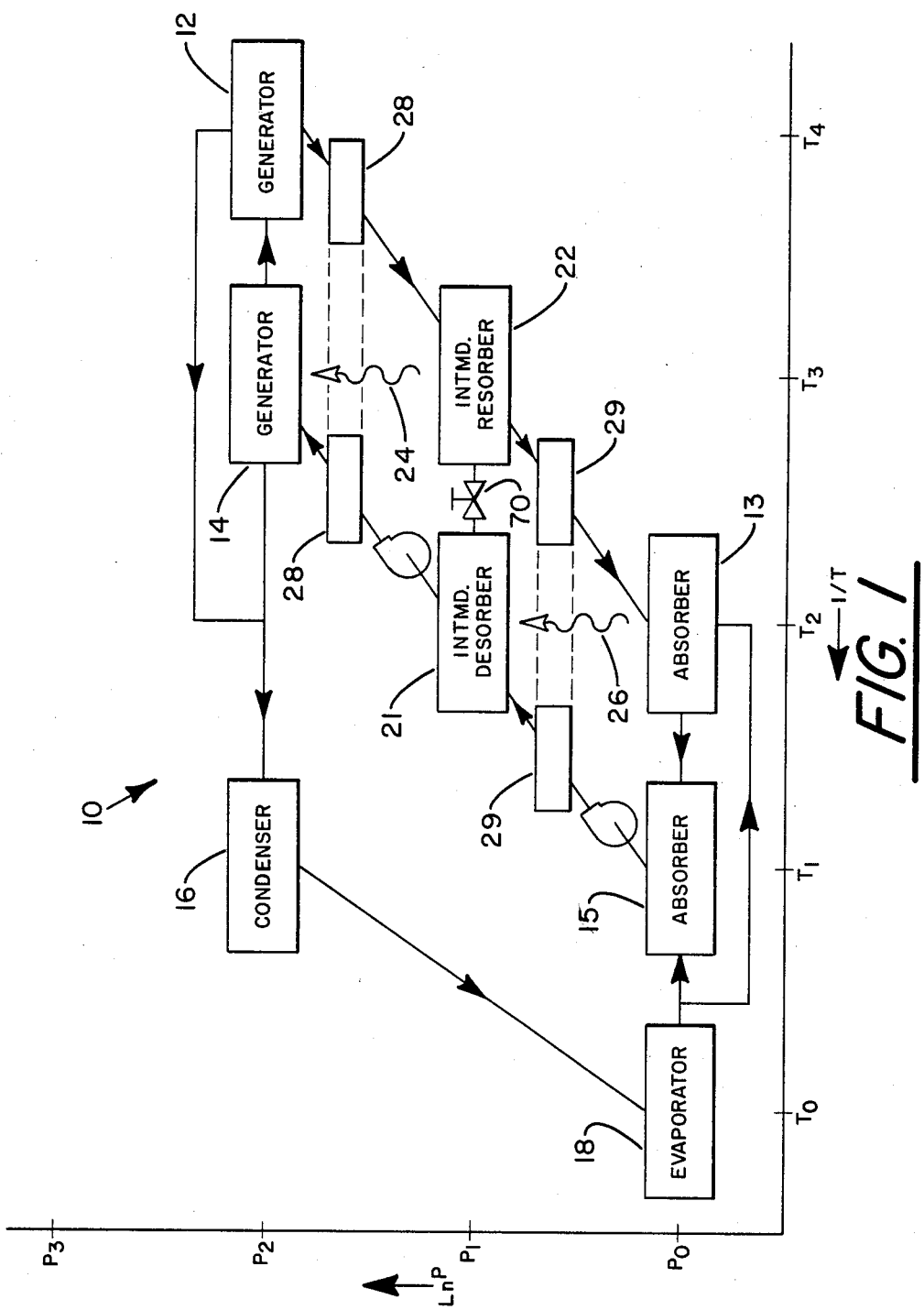
FIG. 1 is a schematic representation of a variable effect cycle of the present invention.

FIG. 1 illustrates a schematic representation of a variable effect desorber-resorber absorption system 10. The present system comprises a high temperature generator 12 and absorber 13, a low temperature generator 14 and absorber 15, a condenser 16, evaporator 18, an intermediate desorber 21 and resorber 22 pair, and a variable control valve in the vapor stream from the desorber. This schematic representation is shown within a coordinate system having increasing temperature from left to right along the abscissa and increasing pressure from bottom to top along the ordinate. Accordingly, the upper limit of the high temperature generator 12 is at a higher relative temperature than the upper limit of the low temperature generator 14. It is noted, however, that the high temperature generator 12 and the low temperature generator can be combined into a single vessel. The low temperature generator 14 is thermally coupled to the intermediate resorber 22 by a heat exchange means 24, such as a heat pipe or the like, which supplies heat to the low temperature generator 14. Similarly, the high temperature absorber 13 is in heat exchange relationship with the intermediate desorber 21 through heat exchange mans 25, also a heat pipe of the like.

Figure 2:
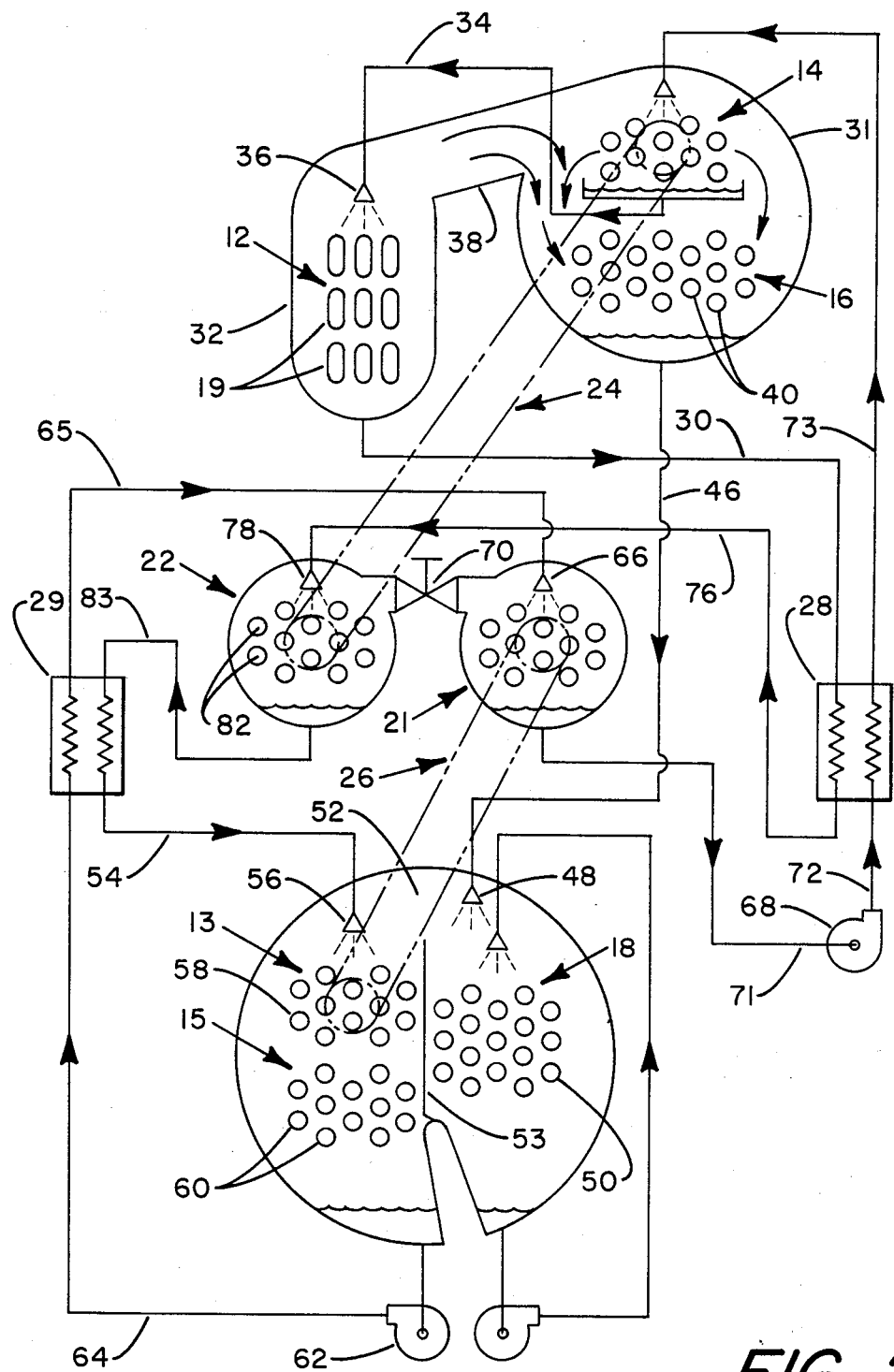
FIG. 2 is a diagrammatic view of a variable effect cycle of the present invention.

Heat is also recovered from the strong absorbent leaving the high temperature generator 12 by heat exchanger 28, which is in heat exchange relationship with the weak solution entering the low temperature generator 14. Moreover, the solution leaving the resorber 22 is in heat exchange relationship with the solution entering the desorber 21 through heat exchanger 29. Referring now to FIG. 2, high temperature generator 12 is contained within a shell 32 and is heated by combustion gases from a burner (not shown) which flow through heat exchanger 19. A direct-fired submerged tube bundle heat exchanger could also be used to transfer heat to the high temperature generator. Heat is transferred from the combustion gases in the heat exchanger 19 to a weak absorbent solution being discharged from conduit 34 through spray header 36. The heat concentrates the weak solution by removing refrigerant therefrom. The refrigerant flows from the high temperature generator 12 through conduit 38 into low temperature generator 14 which is within shell 31. The low temperature generator 14 concentrates the weak solution flowing through conduit 42 and spray header 44. The vaporized refrigerant from both the high and low temperature generators is combined in condenser 16 and flows over heat exchange tubes 40 where it is condensed and collected in a low portion thereof. The condensed refrigerant is conveyed through conduit 46 to evaporator 18. This condensed refrigerant is flash cooled by the reduction in pressure of a working fluid, such as chilled water, flowing through tubes 50 within evaporator 18.

Vaporized refrigerant within evaporator 18 flows through opening 52 in partition 53 which separates the high temperature evaporator 18 from the high temperature absorber 13, where it is absorbed by the strong solution supplied to the high temperature absorber 13 from conduit 54 through spray header 56. The solution, after flowing across tubes 58, continues to flow across tubes 60 in low temperature absorber 15. The dilute solution exiting the absorbers is pumped therefrom by solution pump 62 by way of conduit means 64 through heat exchanger 29, conduit 65 and spray header 66 to desorber 21. The refrigerant in solution entering the desorber 21 is partially vaporized by heat exchange means 26 (shown in phantom as a heat pipe). The remaining condensed solution is pumped therefrom by low temperature solution pump 68 by way of conduit means 71, 72 and 73, through heat exchanger 28 and spray header 74 to low temperature generator 14.

The refrigerant vapor from the desorber 21 flows through capacity control valve 70 to resorber 22, where it combines with the strong absorbent discharged from high temperature generator 12 through conduit means 30, heat exchanger 28, conduit means 76 and spray header 78. Capacity control for load matching is achieved by modulating control valve 70. Accordingly, when control valve 70 is closed the system operates as a single loop. The dilute solution flows across tubes 82 of heat exchanger means 24 (shown in phantom as a heat pipe), and rejects heat thereto, and then flows through conduit mans 83 and 54, and heat exchanger 29, to be finally discharged from spray header 56, thus completing the fluid flow through the cycle.

The secondary system (not shown) for providing heat to or removing heat from a load generally includes an indoor and outdoor coil, known in the art, which connect through the tubes 40, 50 and 60 in the absorption machine.

What is claimed is:

1. An absorption heat pump/refrigeration system having a single absorbent solution flowing therethrough comprising:
   a first generator means operating within a first temperature range for heating a weak absorbent solution to generate a vaporized refrigerant and a strong refrigerant solution;
   a second generator means operating at a second lower temperature range relative to said first generator means for heating a second weak absorbent solution to vaporize refrigerant;
   a condenser means cooperating with said first and second generator means for condensing the vaporized refrigerant generated therein;
   an evaporator means for receiving the condensed refrigerant from said condenser means, said condensed refrigerant in heat exchange relationship with a heat source means for vaporizing said condensed refrigerant within said evaporator means;

an absorber means for receiving the vaporized condensed refrigerant from said evaporator means in combination with a strong absorbent solution to absorb the refrigerant in the absorbent for generating a weak solution;

a desorber means for receiving said generated weak solution from said absorber means, and generating a refrigerant vapor therein;

a resorber means for receiving said refrigerant vapor from said desorber means in combination with said strong refrigerant solution of said first generator means for generating a resorber solution; and means for controlling the flow of said refrigerant vapor from said desorber means to said resorber means to control the capacity of the absorption system.

* * * * *